United States Patent
Nakazawa (10) Patent No.: US 7,136,911 B1
(45) Date of Patent: Nov. 14, 2006

(54) DISTRIBUTED DIRECTORY MANAGEMENT SYSTEM

(75) Inventor: Osamu Nakazawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/504,293

(22) Filed: Feb. 15, 2000

(30) Foreign Application Priority Data

Feb. 26, 1999 (JP) ................................ 11-049346

(51) Int. Cl.
  *G06F 15/177* (2006.01)
  *G06F 15/173* (2006.01)
(52) U.S. Cl. .................... 709/223; 709/220; 707/10
(58) Field of Classification Search ............... 707/10, 707/100–104.1; 709/223, 224, 225, 226, 709/220
See application file for complete search history.

(56) References Cited

U.S. PATENT DOCUMENTS

| | | | | |
|---|---|---|---|---|
| 5,907,837 | A * | 5/1999 | Ferrel et al. .................... | 707/3 |
| 6,101,539 | A * | 8/2000 | Kennelly et al. ............ | 709/223 |
| 6,208,986 | B1 * | 3/2001 | Schneck et al. ................ | 707/3 |
| 6,339,827 | B1 * | 1/2002 | Stokes et al. ................ | 713/176 |
| 6,359,909 | B1 * | 3/2002 | Ito et al. ...................... | 370/522 |
| 6,366,913 | B1 * | 4/2002 | Fitler et al. .................... | 707/9 |
| 6,553,368 | B1 * | 4/2003 | Martin et al. .................. | 707/3 |
| 6,983,276 | B1 * | 1/2006 | Tenorio ......................... | 707/7 |

FOREIGN PATENT DOCUMENTS

| | | |
|---|---|---|
| JP | 6-139126 | 5/1994 |
| JP | 8-329093 | 12/1996 |
| JP | 9-179771 | 7/1997 |
| JP | 10-31615 | 2/1998 |
| JP | 10-187524 | 7/1998 |
| JP | 10-228486 | 8/1998 |
| JP | 10-308733 | 11/1998 |

* cited by examiner

*Primary Examiner*—Ario Etienne
*Assistant Examiner*—El Hadji M. Sall
(74) *Attorney, Agent, or Firm*—Rabin & Berdo, P.C.

(57) ABSTRACT

A distributed directory management system includes a plurality of service spaces on a network each having an object repository storing service objects to be retrieved and attribute information pieces thereof. A service object managing mechanism for each service space manages the object repository and executes retrieval of a service object using the attribute information piece as a key. A service space connection managing mechanism for each service space implements message communication with the service object managing mechanisms to collect mutual connection information of the service spaces and manages the collected mutual connection information. A service object retrieval managing mechanism for each service space sends a retrieval message from a user to the service object managing mechanism in the same service space to request execution of retrieval of a service object. Upon failure in retrieval, the service object retrieval managing mechanism requests another service object managing mechanism to execute retrieval of the service object.

9 Claims, 11 Drawing Sheets

DISTRIBUTED DIRECTORY MANAGEMENT SYSTEM

BACKGROUND OF THE INVENTION

1. Field of the Invention

The present invention relates to a distributed directory management system which enables retrieval and management of various service objects while coping with changes of a network structure in a complicated network environment such as a large scale intranet or the Internet.

2. Description of the Related Art

For retrieving various information in a complicated network environment such as a large scale intranet or the Internet, a system is necessary for managing and accessing the information. This system is called a directory management system, and there are directory services for offering such a system to users. As examples of the directory services, there are known the "hosts" file and the DNS (domain name system) for recording and managing the correspondence between host names and IP addresses in the TCP/IP network. These are a kind of database files with a name managing function.

There is available another directory service called X.500 regulated by the CCITT. This regulates protocols and structures of distributed arrangement/hierarchy management/reproduction management of directories and manages various network resources according to an object oriented concept. Here, the network resources refer to information about directories. The X.500 directory service has been widely adopted in distributed operating systems, distributed processing middleware and so on.

In the X.500, when a user is connected to the directory service to retrieve/change a service object in a directory, a protocol called a DAP (directory access protocol) is used. The service object is information to be retrieved by the user. There has further appeared the LDAP (Lightweight Directory Access Protocol) which solves a problem of the DAP and is used as an access protocol in many directory services.

For example, the LDAP is used in the active directory function introduced in WindowsNT5.0 and, the Netscape Directory Server.

The foregoing conventional techniques, however, have the following problem.

While running the network, the network resources used in the directory service, i.e. the information about the network directory, are changed through addition, deletion and update according to various environmental changes. However, the management of the directory service corresponding to those changes is carried out manually, which is quite bothersome.

On the other hand, the directory service for realizing cooperation of networks each having a unique service space is called a hierarchy managing function between directories. In this directory service, when a user in a certain service space retrieves a target service object, it is necessary that the user knows a hierarchy structure between directories and carries out a retrieval process corresponding thereto. Accordingly, without recognizing the hierarchy structure between the directories, the proper retrieval can not be achieved.

Further, when utilizing the network in such a large scale wide-area distributed environment, a mechanism is necessary for giving a right of using the system to only those users having particular qualification, per service space. The conventional directory service protocols are not provided with a function satisfying such a requirement.

SUMMARY OF THE INVENTION

Therefore, it is an object of the present invention to provide an improved distributed directory management system which can solve the foregoing problems.

According to one aspect of the present invention, there is provided a distributed directory management system for offering a retrieval service with respect to service objects stored in object repositories located in service spaces, respectively, the system comprising a service space centralized managing mechanism, service object managing mechanisms provided corresponding to the service spaces, respectively, service space connection managing mechanisms provided corresponding to the service spaces, respectively, and service object retrieval managing mechanisms provided corresponding to the service spaces, respectively, wherein the service space centralized managing mechanism collects mutual connection information of the service spaces from the service space connection managing mechanisms and manages the collected mutual connection information, wherein each of the service object managing mechanisms manages corresponding one of the object repositories and executes retrieval of a service object in the corresponding one of the object repositories, wherein each of the service space connection managing mechanisms implements message communication with the service object managing mechanisms to collect mutual connection information of corresponding one of the service spaces and another of the service spaces, and manages the collected mutual connection information, and wherein each of the service object retrieval managing mechanisms sends a retrieval message from a user to corresponding one of the service object managing mechanisms to request retrieval of a service object in the corresponding one of the object repositories, receives a result of the retrieval from the corresponding one of the service object managing mechanisms, analyzes the result of the retrieval and produces a message to be sent to the user based on the analyzed result of the retrieval.

It may be arranged that each of the service object managing mechanisms sends a message indicative of existence thereof, every time a state thereof is changed, to corresponding one of the service space connection managing mechanisms, and that each of the service space connection managing mechanisms receives the message from corresponding one of the service object managing mechanisms to update mutual connection information between corresponding one of the service spaces and another of the service spaces.

It may be arranged that each of the service object managing mechanisms periodically sends a message indicative of existence thereof to corresponding one of the service space connection managing mechanisms, and that each of the service space connection managing mechanisms receives the message from corresponding one of the service object managing mechanisms to update mutual connection information between corresponding one of the service spaces and another of the service spaces.

It may be arranged that each of the service object managing mechanisms uses a multi cast announcing function to send the message indicative of the existence thereof.

It may be arranged that upon receiving the retrieval message from the user, corresponding one of the service object retrieval managing mechanisms uses the mutual connection information managed by corresponding one of the service space connection managing mechanisms so as to send the retrieval message to corresponding one of the service spaces and another of the service spaces for requesting the retrieval.

It may be arranged that the distributed directory management system further comprises directory managing authentication mechanisms provided corresponding to the service spaces, respectively, wherein each of the directory managing authentication mechanisms has a function of issuing a ticket for using the retrieval service to a user and, when the ticket is submitted by the user, verifies legitimacy of the ticket so as to allow the user to access to corresponding one of the object repositories.

It may be arranged that the distributed directory management system further comprises directory managing authentication mechanisms provided corresponding to the service spaces, respectively, wherein each of the directory managing authentication mechanisms has a function of verifying legitimacy of a digitally signed retrieval message of a user so as to allow the user to access to corresponding one of the object repositories.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, preferred embodiments of the present invention will be described hereinbelow with reference to the accompanying drawings.

First Embodiment

Figure 1:
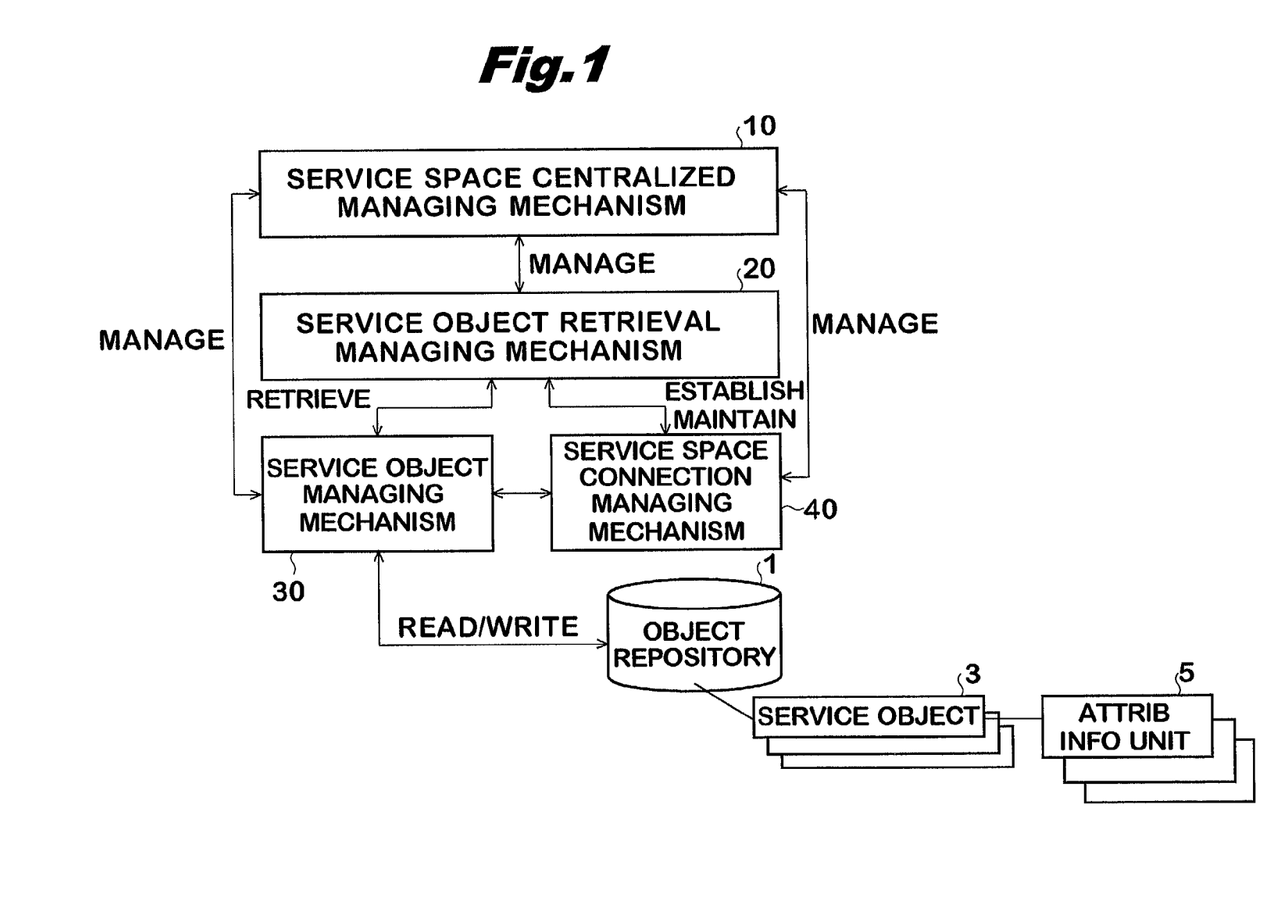
FIG. 1 is a structural diagram of the main part of a distributed directory management system according to a first preferred embodiment of the present invention.

FIG. 1 is a structural diagram of the main part of a distributed directory management system according to the first preferred embodiment of the present invention.

The shown system comprises a service space centralized managing mechanism 10, a service object retrieval managing mechanism 20, a service object managing mechanism 30 and a service space connection managing mechanism 40. Using these mechanisms, the system implements directory management. An object repository 1 is a database storing service objects 3 to be actually retrieved by users and corresponding attribute information units 5.

The service objects 3 include various information, such as data files and programs, to be retrieved and referred to via a network. The attribute information units 5 each include keywords and other information. The keywords are associated with the corresponding service objects 3 and used for facilitating retrieval thereof. Users use keywords included in the attribute information units 5 to search for desired service objects on the network.

The service object managing mechanism 30 is provided for managing the service objects 3 and the attribute information units 5 stored in the object repository 1 and executing retrieval of the service objects 3.

In a distributed network environment, there exist many service spaces offering the foregoing service objects.

The foregoing mechanisms shown in FIG. 1 are realized by software as, for example, instance objects in the Java language environment, wherein the mechanisms exchange necessary information via message communication among the instance objects so as to realize respective functions thereof.

Figure 2:
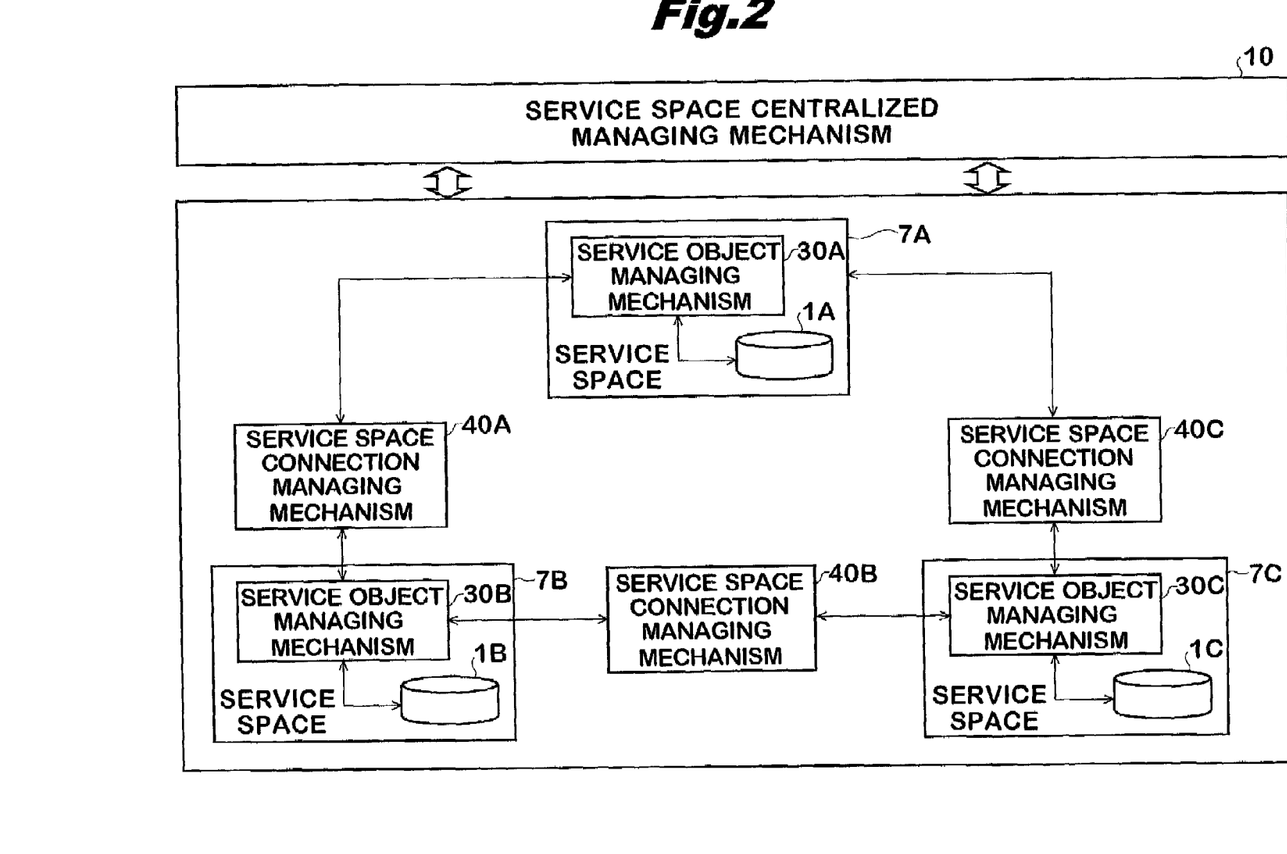
FIG. 2 is a structural diagram of the whole distributed directory management system according to the first preferred embodiment of the present invention.

FIG. 2 is a structural diagram of the whole distributed directory management system covering a plurality of service spaces.

As shown in FIG. 2, the service space centralized managing mechanism 10 manages a plurality of service spaces 7A, 7B and 7C in a centralized fashion. The service spaces 7A, 7B and 7C include object repositories 1A, 1B and 1C, respectively, and further include service object managing mechanisms 30A, 30B and 30C for managing the object repositories 1A, 1B and 1C, respectively.

One service space may include a desired number of object repositories. Further, one service object managing mechanism may manage more than one object repositories. FIG. 2 shows an example wherein one service space includes one object repository and one service object managing mechanism.

Service space connection managing mechanisms 40A, 40B and 40C dynamically manage mutual connection information of the service spaces 7A to 7C. As shown in the figure, the service spaces 7A to 7C are interconnected with each other via the service space connection managing mechanisms 40A to 40C. For example, when a message for service retrieval is used in the service space 7A, this message can also be used for service retrieval in the service spaces 7B and 7C.

The service space connection managing mechanisms 40A to 40C collect and update mutual connection information of the service spaces 7A to 7C by message communication with the service object managing mechanisms 30A to 30C.

In FIG. 2, service object retrieval managing mechanisms each corresponding to the service object retrieval managing mechanism 20 shown in FIG. 1 are not shown for brevity of illustration, but are actually provided with respect to the services spaces 7A to 7C, respectively, for communication with the associated mechanisms as shown in FIG. 1.

Figure 3:
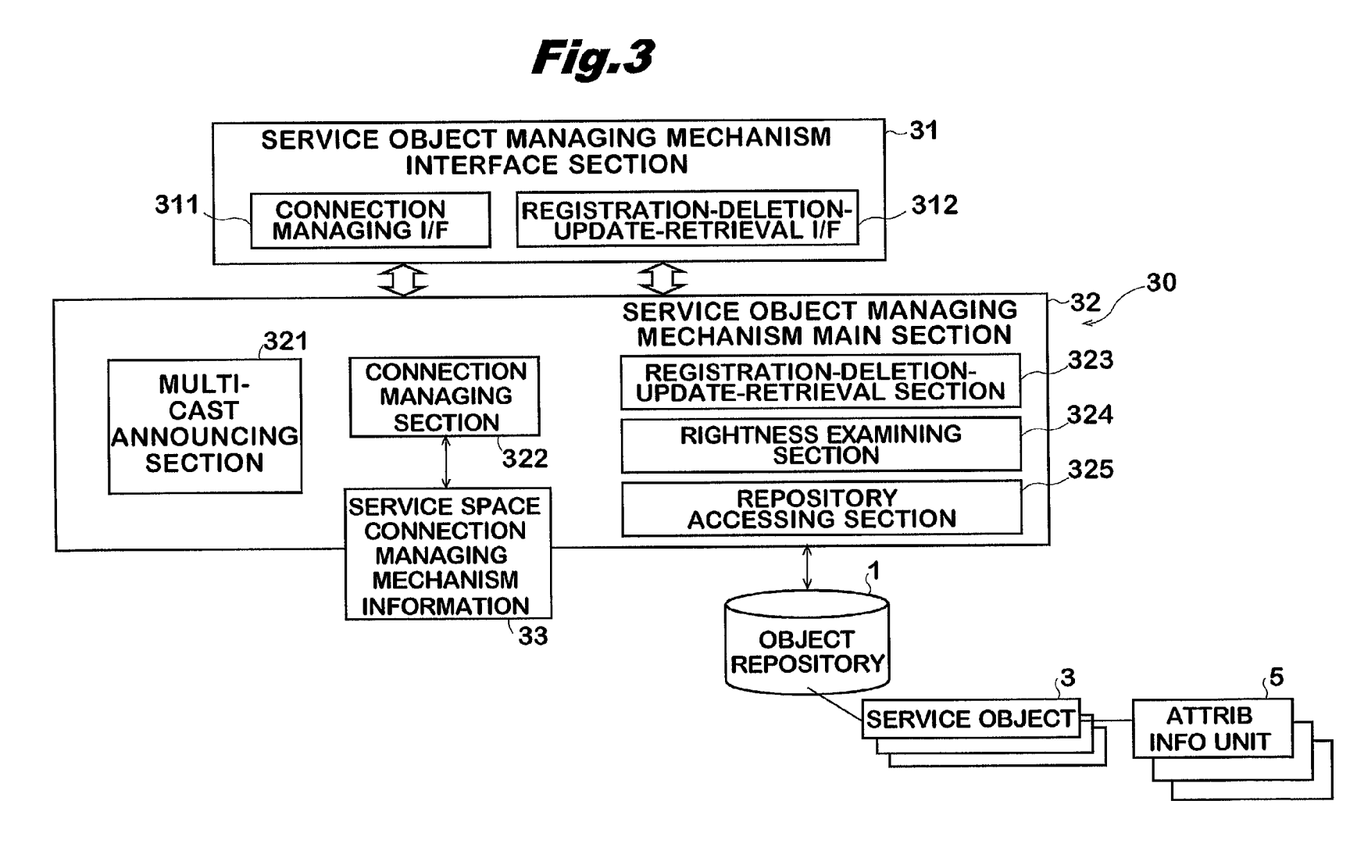
FIG. 3 is a structural diagram of a service object managing mechanism shown in FIG. 1.

FIG. 3 shows a structure of the service object managing mechanism 30 shown in FIG. 1. The service object managing mechanism 30 corresponds to each of the service object managing mechanisms 30A to 30C shown in FIG. 2.

As shown in FIG. 3, the service object managing mechanism 30 comprises a service object managing mechanism interface section 31 and a service object managing mechanism main section 32.

The service object managing mechanism interface section 31 includes a connection managing interface (I/F) 311 and a registration-deletion-update-retrieval interface 312.

The connection managing interface 311 is connected to the service space centralized managing mechanism 10 for receiving managing information and sending managing information including the foregoing mutual connection information. The registration-deletion-update-retrieval interface 312 is connected to the service object retrieval managing mechanism 20 for receiving a retrieval message of a user and sending an answer thereof.

The service object managing mechanism main section 32 comprises a multi cast announcing section 321, a connection managing section 322, a registration-deletion-update-retrieval section 323, a rightness examining section 324 and a repository accessing section 325.

The multi cast announcing section 321 periodically notifies information indicative of the state of the subject service object managing mechanism 30, i.e. indicative of existence thereof, to the service space connection managing mechanism 40 shown in FIG. 1.

Specifically, the multi cast announcing section 321 uses a multi cast announcing function to periodically send an information message within a range defined by a multi cast radius. The multi cast radius represents a distance for defining a range with respect to the service object managing mechanism in which information should be notified. For example, the multi cast radius may be determined to define a range covering several service spaces which are likely to be used by the same user. Accordingly, the multi cast announcing section 321 periodically sends a message indicative of existence of the subject service object managing mechanism 30 for giving mutual connection information not only to the service space connection managing mechanism 40 managing the service space where the subject service object managing mechanism 30 exists, but also to service space connection managing mechanisms managing other service spaces.

The connection managing section 322 implements message communication with the service space connection managing mechanism 40 for carrying out connection management of the service spaces which will be explained later referring to FIG. 7. The message includes service space connection managing mechanism information 33. Upon request from a manager, the registration-deletion-update-retrieval section 323 implements registration, deletion, update or retrieval of the service objects 3 and the attribute information units 5 stored in the object repository 1.

The rightness examining section 324 examines the rightness of each service object 3 stored in the object repository 1, i.e. checks whether it is an available service object or an unavailable service object. For example, when the effective term of a service object is expired, the rightness examining section 324 automatically deletes such a service object from the object repository 1.

The repository accessing section 325 accesses the service objects 3 stored in the object repository 1 based on a request from the registration-deletion-update-retrieval section 323.

Figure 4:
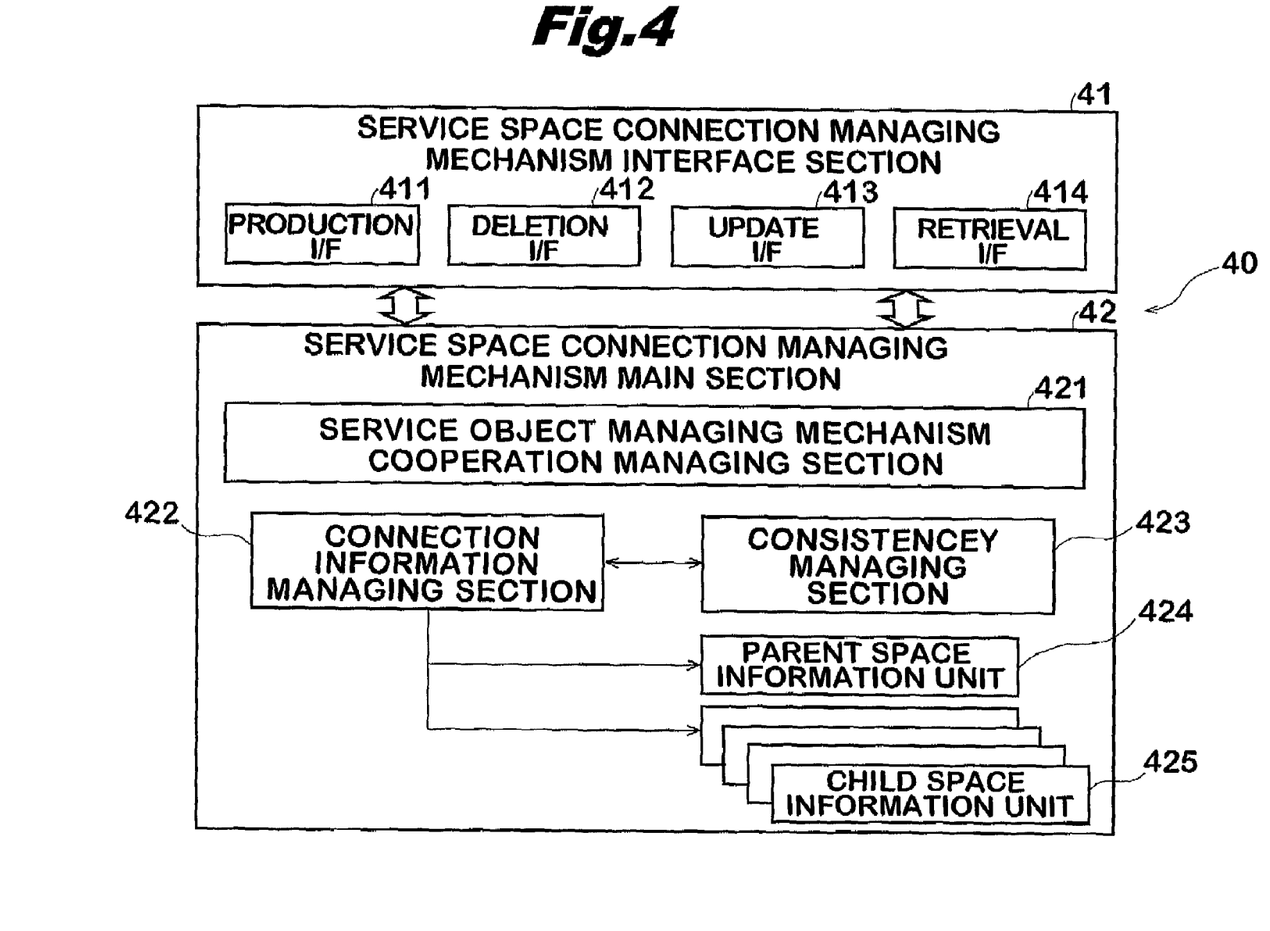
FIG. 4 is a structural diagram of a service space connection managing mechanism shown in FIG. 1.

FIG. 4 shows a structure of the service space connection managing mechanism 40 shown in FIG. 1. The service space connection managing mechanism 40 corresponds to each of the service space connection managing mechanisms 40A to 40C shown in FIG. 2.

The service space connection managing mechanism 40 comprises a service space connection managing mechanism interface section 41 and a service space connection managing mechanism main section 42. The service space connection managing mechanism interface section 41 includes a production interface 411, a deletion interface 412, an update interface 413 and a retrieval interface 414. The service space connection managing mechanism main section 42 includes a service object managing mechanism cooperation managing section 421, a connection information managing section 422 and a consistency managing section 423. The connection information managing section 422 stores a parent space information unit 424 and child space information units 425.

The service space connection managing mechanism interface section 41 produces, deletes, updates and retrieves mutual connection information of its managing service space. As described above, the mutual connection information is collected via message communication from the service object managing mechanism 30.

The service object managing mechanism cooperation managing section 421 receives message communication from its managing service object managing mechanisms 30 in its managing service space, wherein one service space includes a plurality of service object managing mechanisms. The service object managing mechanism cooperation managing section 421 stores information in a list of all the service object managing mechanisms 30 located in its managing service space for managing all of them. The connection information managing section 422 stores a parent-child relationship with respect to other service spaces and information about those service spaces. In FIG. 4, the connection information managing section 422 stores a parent space information unit 424 and a plurality of child space information units 425. The parent space information unit 424 includes identification data of a service space to be a parent, while the child space information unit 425 includes identification data of a service space to be a child. There is a case wherein the number of child service spaces may be one or zero.

The consistency managing section 423 has a function of guaranteeing that one service space is prevented from being managed by two or more service space connection managing mechanisms simultaneously. Specifically, one service space is managed by one service space connection managing mechanism wherein information about all the service object managing mechanisms located in the subject service space is collected and managed as described above. Further, as also described above, information about other service spaces in a parent-child relationship with the subject service space is stored. This arrangement is for ensuring the consistency of information about each service space. It may also be arranged that one service space connection managing mechanism manages two or more service spaces.

Figure 5:
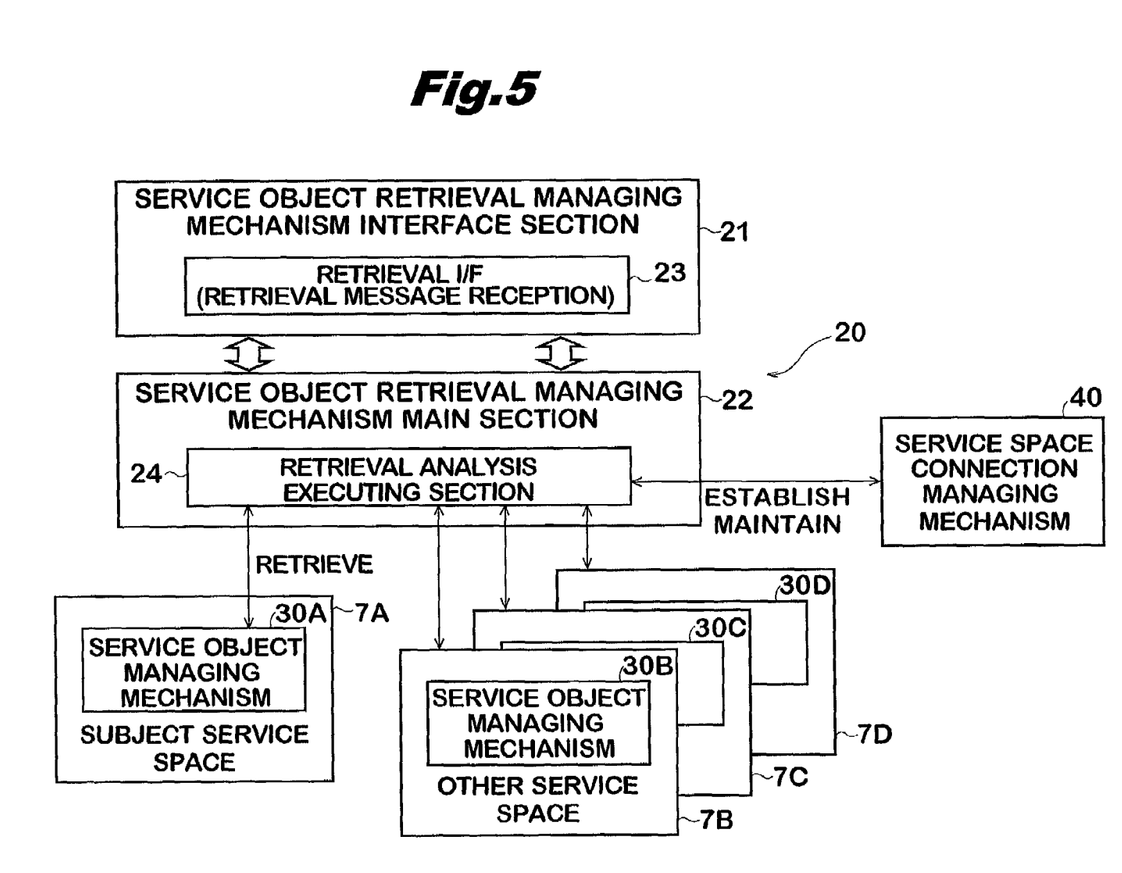
FIG. 5 is a structural diagram of a service object retrieval managing mechanism shown in FIG. 1.

FIG. 5 shows a structure of the service object retrieval managing mechanism 20.

As shown in FIG. 5, the service object retrieval managing mechanism 20 comprises a service object retrieval managing mechanism interface section 21 and a service object retrieval managing mechanism main section 22.

The service object retrieval managing mechanism interface section 21 includes a retrieval interface 23. The retrieval interface 23 has a function of receiving a retrieval message from a user.

The service object retrieval managing mechanism main section 22 includes a retrieval analysis executing section 24. The retrieval analysis executing section 24 analyzes the contents of a retrieval message and requests a retrieval process to a target service space. For example as shown in FIG. 5, the retrieval analysis executing section 24 sends a retrieval message to the service object managing mechanism 30A located in the service space 7A to which it belongs, so as to request retrieval of a corresponding service object. Further, the retrieval analysis executing section 24 receives a retrieval result from the service object managing mechanism 30A, analyzes its contents and sends it to the user.

On the other hand, in response to a message from the service object managing mechanism 30A indicative of failure in retrieval, the retrieval analysis executing section 24 uses information stored in the corresponding service space connection managing mechanism 40 to send the retrieval message to other service spaces 7B to 7D in a parent-child relationship with the service space 7A for requesting retrieval. In this fashion, by using the information stored in the service space connection managing mechanism 40, a retrieval message can be sent beyond the service spaces so that retrieval of a service object over the wide range can be accomplished.

Figure 6:
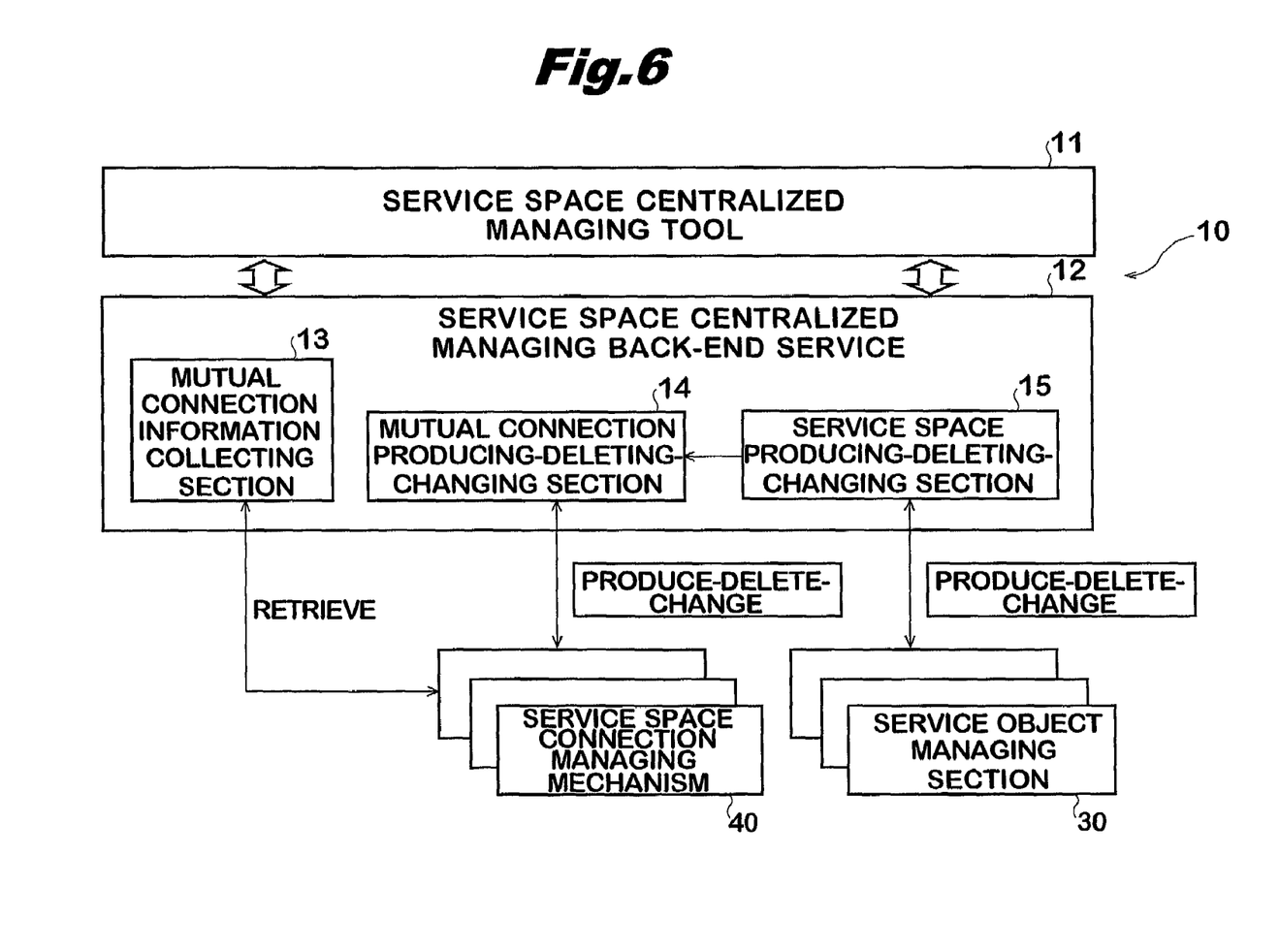
FIG. 6 is a structural diagram of a service space centralized managing mechanism shown in FIG. 1.

FIG. 6 shows a structure of the service space centralized managing mechanism 10.

As shown in FIG. 6, the service space centralized managing mechanism 10 comprises a service space centralized managing tool 11 and a service space centralized managing back-end service 12. The service space centralized managing back-end service 12 includes a mutual connection information collecting section 13, a mutual connection producing-deleting-changing section 14 and a service space producing-deleting-changing section 15. With this arrangement, the service space centralized managing mechanism 10 realizes a managing function about the life cycle and the mutual connection of all the service spaces.

Via message communication with the service space connection managing mechanisms 40, the service space centralized managing mechanism 10 produces new service spaces and carries out deletion and alteration of unnecessary service spaces.

The mutual connection information collecting section 13 collects information of the service space connection managing mechanisms 40 to obtain mutual connection information about all the service spaces covered by the service space centralized managing mechanism 10 and a relationship thereamong.

The mutual connection producing-deleting-changing section 14 implements production, deletion and alteration of the mutual connection information based on the information collected by the mutual connection information collecting section 13.

The service space producing-deleting-changing section 15 communicates with the service object managing mechanisms 30 of the service spaces to control production, deletion and alteration of the service spaces.

Specifically, in the service space centralized managing back-end service 12, mutual connection information about all the service object managing mechanisms, all the service spaces to which they belong, and the relationship among the service spaces is collected and managed unitarily.

The foregoing mutual connection information is obtained via message communication between the service space centralized managing mechanism 10 and the service space connection managing mechanisms 40. For example, mutual connection alteration of the service space is performed by the service space connection managing mechanism 40 in response to a request from the service space centralized managing mechanism 10, and resultant mutual connection information is obtained via message communication between the service space centralized managing mechanism 10 and the service space connection managing mechanism 40.

Now, an operation of the system will be described.

Figure 7:
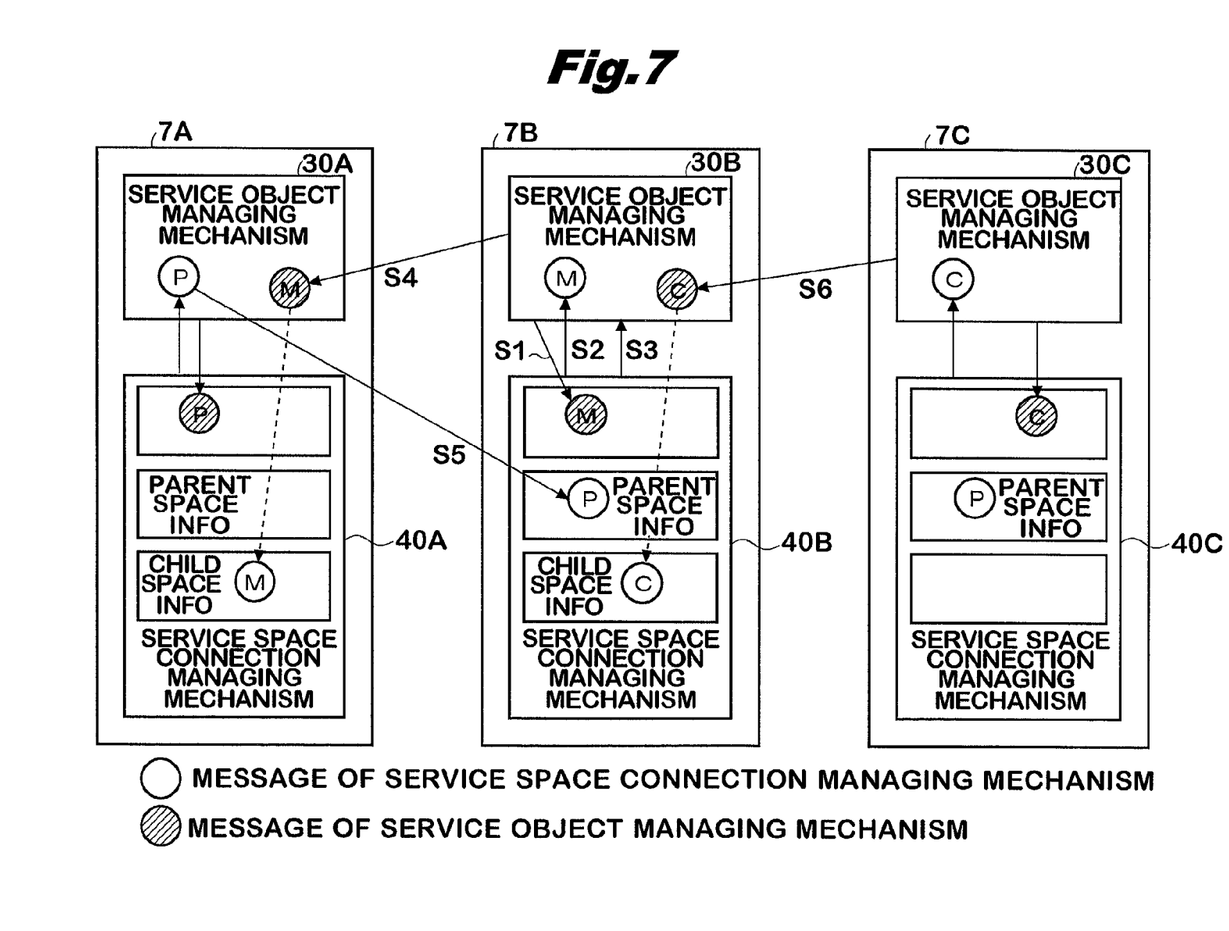
FIG. 7 is a diagram for explaining operations of service space connection managing mechanisms according to the first preferred embodiment of the present invention.

FIG. 7 is a diagram for explaining operations of the service space connection managing mechanisms 40A to 40C. In the figure, steps S1 to S6 represent operations in time sequence. It is assumed that there exist service spaces 7A and 7C and that there are newly produced a service space 7B as well as a service object managing mechanism 30B managing service objects in the service space 7B and a service space connection managing mechanism 40B.

First, the service object managing mechanism 30B sends a message M to the service space connection managing mechanism 40B for notifying existence thereof. Accordingly, the service object managing mechanism 30B is registered in the service space connection managing mechanism 40B so as to be an object to be managed by the service space connection managing mechanism 40B (step S1). This also causes the service space connection managing mechanism 40B to recognize that it is in charge of managing the service space 7B. The service space connection managing mechanism 40B returns the message M to the service object managing mechanism 30B for notifying that it is in charge of managing the service space 7B (step S2).

Then, for notifying an occurrence of this event to the service space connection managing mechanism 40A which is in charge of managing the other service space 7A, the service space connection managing mechanism 40B requests the service object managing mechanism 30B to issue an event notification (step S3). In response to this request, the service object managing mechanism 30B sends the message M indicative of existence thereof to the service object managing mechanism 30A which manages service objects in service space 7A. In response to receipt of the message M, the service object managing mechanism 30A transfers the message M to the service space connection managing mechanism 40A in charge of the service space 7A (step S4).

The service space connection managing mechanism 40A registers the service space 7B as a child service space. As a result, a parent-child relationship between the service spaces 7A and 7B is determined. In this embodiment, it is predetermined that the side having sent a registration request becomes a child service space and the side having received the request becomes a parent service space so that the parent-child relationship is automatically determined. It may also be arranged that the parent-child relationship is determined based on other information included in the message.

Then, the service space connection managing mechanism 40A sends, via the service object managing mechanism 30A, a message P requesting a registration of the service space 7A as a parent service space, to the service space connection managing mechanism 40B. In response to receipt of the message P, the service space connection managing mechanism 40B registers the service space 7A as a parent service space (step S5).

Through the foregoing operations, the service space connection managing mechanism 40A of the service space 7A and the service space connection managing mechanism 40B of the service space 7B are linked together by obtaining the child space information unit of the service space 7B and the parent space information unit of the service space 7A, respectively. For example, a connection relationship is established wherein when one of the service spaces 7A and 7B receives a retrieval message, the retrieval message is transferred from the service space 7A to the service space 7B or from the service space 7B to the service space 7A.

As described above, when a service object managing mechanism is newly produced, the service object managing mechanism sends a corresponding message to a service space connection managing mechanism in the same service space. Following this message, the service space connection managing mechanism exchanges connection managing information with a service space connection managing mechanism in another service space so that both service space connection managing mechanisms update parent and child space information pieces of their own. In this fashion, information defining a connection relationship between the service spaces can be collected.

On the other hand, as described before, the service object managing mechanism uses the multi cast announcing function to periodically notify its own state, i.e. a message indicative of existence or presence thereof, to nearby service space connection managing mechanisms within the range of the multi cast radius. It may also be arranged that the service object managing mechanism designates a particular service space located outside such a range and sends a message thereto. Step S6 in FIG. 7 represents such a case wherein the service space connection managing mechanism 40B registers the service space 7C including the service object managing mechanism 30C as a child service space using a message C. As appreciated, the side having received the message C becomes a parent service space as in the foregoing case of the service spaces 7A and 7B.

Apart from the multi cast announcement, the service object managing mechanism notifies its own state, i.e. a message indicative of existence thereof, to service space connection managing mechanisms managing nearby service spaces every time an event based on a change in its own state, such as the production of the new service object managing mechanism as described above, occurs.

Through such message communication, each service space connection managing mechanism clarifies the states of service object managing mechanisms of all the service spaces and the connection relationship among them so as to accomplish the smooth and reliable directory service.

Figure 8:
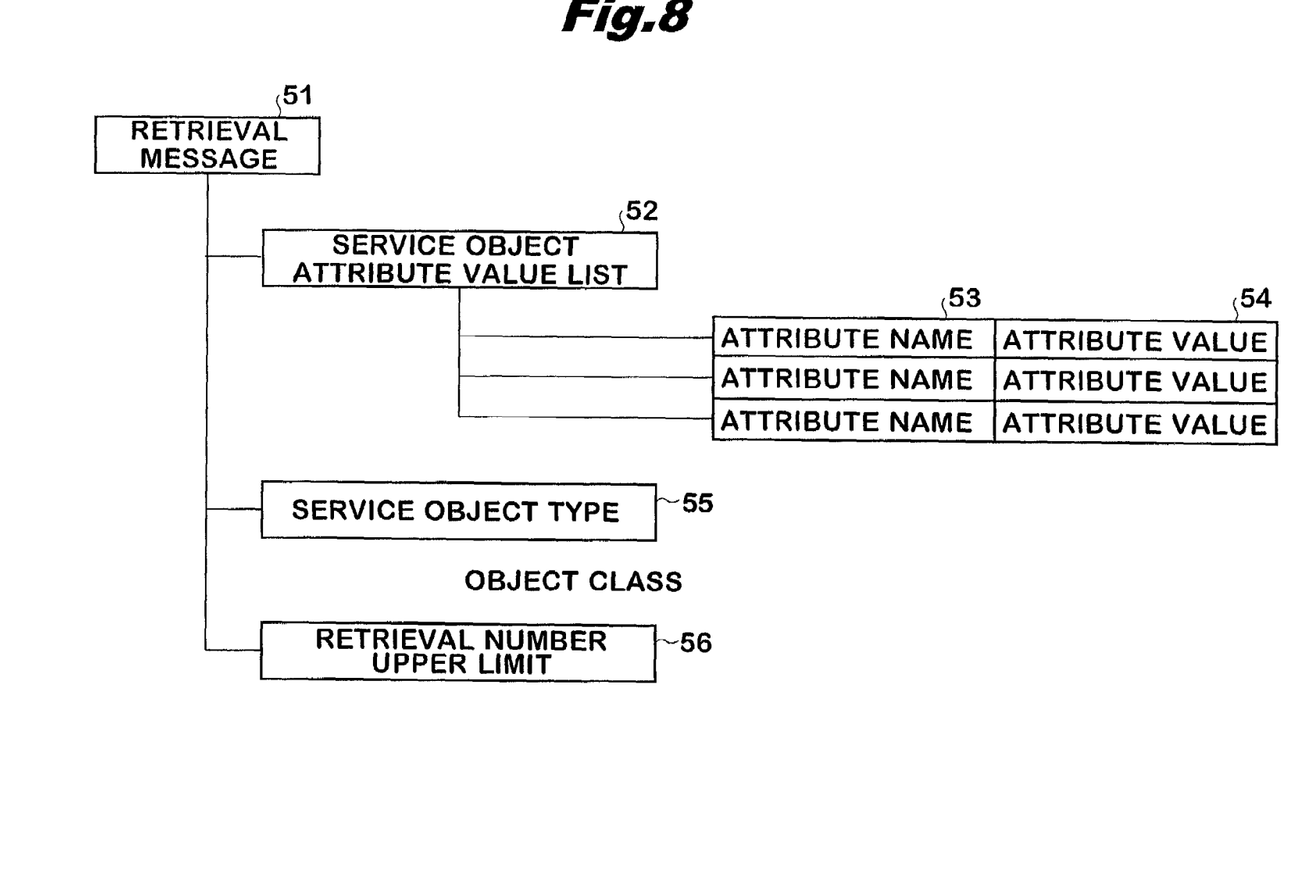
FIG. 8 is a diagram for explaining a retrieval message inputted into the service object retrieval managing mechanism shown in FIG. 1.

FIG. 8 shows the contents of a retrieval message inputted into the service object retrieval managing mechanism shown in FIG. 5.

Using the retrieval message having the structure shown in FIG. 5, the retrieval service is realized by the foregoing directory management system. A retrieval message 51 includes a service object attribute value list 52, a service object type 55 and a retrieval number upper limit 56.

The service object attribute value list 52 includes attribute names and attribute values for retrieving service objects. The attribute name 53 is, for example, a directory or folder name, and the attribute value 54 is in the form of a retrieval expression composed of keys including, for example, a file name, keyword and wild card, which are connected in AND or OR condition. The contents and the number of the attribute names 53 and the attribute values 54 are arbitrary and may be the same as those known for information retrieval using the Internet.

The service object type 55 is for designating a class based on which a service object is produced. The retrieval number upper limit is a parameter for limiting the information amount of the retrieval result. When the service spaces are mutually connected via the service space connection managing mechanisms as described above, it may happen that a large amount of the retrieval results is outputted. Accordingly, the setting of the retrieval number upper limit is desirable also in view of limiting a retrieval time. When the retrieval message shown in FIG. 8 is inputted into the retrieval analysis executing section 24 via the retrieval interface 23 shown in FIG. 5, the retrieval is requested to the service object managing mechanism 30A as shown in FIG. 5.

The service object managing mechanism 30A searches the object repository 1 using the repository accessing section 325 as shown in FIG. 3 and extracts a service object 3 having attribute information agreeing with the attribute value in the retrieval message. The retrieval result is given to the retrieval analysis executing section 24, and other service spaces are searched if necessary.

When expanding the service spaces to be searched, the direction of expansion may be predetermined, for example, from the child to the parent or from the parent to the child. It may also be arranged that a retrieval range is predetermined based on a relation of the degree between service spaces. For example, a service space in a parent-child relationship to a service space first searched is assigned a relation of the second degree, and a service space in a parent-child relationship to the service space assigned the second degree relation is assigned a relation of the third degree, and the retrieval range is predetermined to cover the third degree relation. It may also be arranged that names of service spaces to be searched are designated specifically. The retrieval range is determined using the information stored in the service space connection managing mechanisms.

The service object retrieval managing mechanism 20 simultaneously sends messages for retrieval request to the service object managing mechanisms located in the service spaces within the thus determined retrieval range. In response to receipt of the retrieval request, each service object managing mechanism implements retrieval independently. When the number of extracted service objects exceeds the retrieval number upper limit 56 included in the retrieval message 51, the service object managing mechanism stops the retrieval and sends the retrieval result to the retrieval analysis executing section 24. In this fashion, the service object retrieval managing mechanism collects the retrieval results in the predetermined service spaces and reports its total result to a user.

It is preferable that the foregoing service space centralized managing mechanism, service object retrieval managing mechanisms, service space connection managing mechanisms, service object managing mechanisms and object repositories are distributed to computers and other terminals on the network and execute shared roles, respectively. The respective mechanisms may be united or located separately, and may be partly formed by hardware.

Effect of First Embodiment

As described above, the service object managing mechanisms managing the object repositories storing the service objects and the service space connection managing mechanisms exchange the mutual connection information via the message communication, respectively, so that the relations and states of the distributed service spaces connected by the network are constantly reflected on the system. Thus, in the network environment wherein registration, update and deletion are constantly carried out, the directory service efficiently dealing with changes of the service objects can be provided.

Further, using the information stored in the service space connection managing mechanisms, the retrieval message can be sent beyond the service spaces so that the wide range of information collection can be automatically achieved.

Second Embodiment

In this embodiment, an authentication mechanism is provided for allowing only those users having access rights to retrieve service objects.

Figure 9:
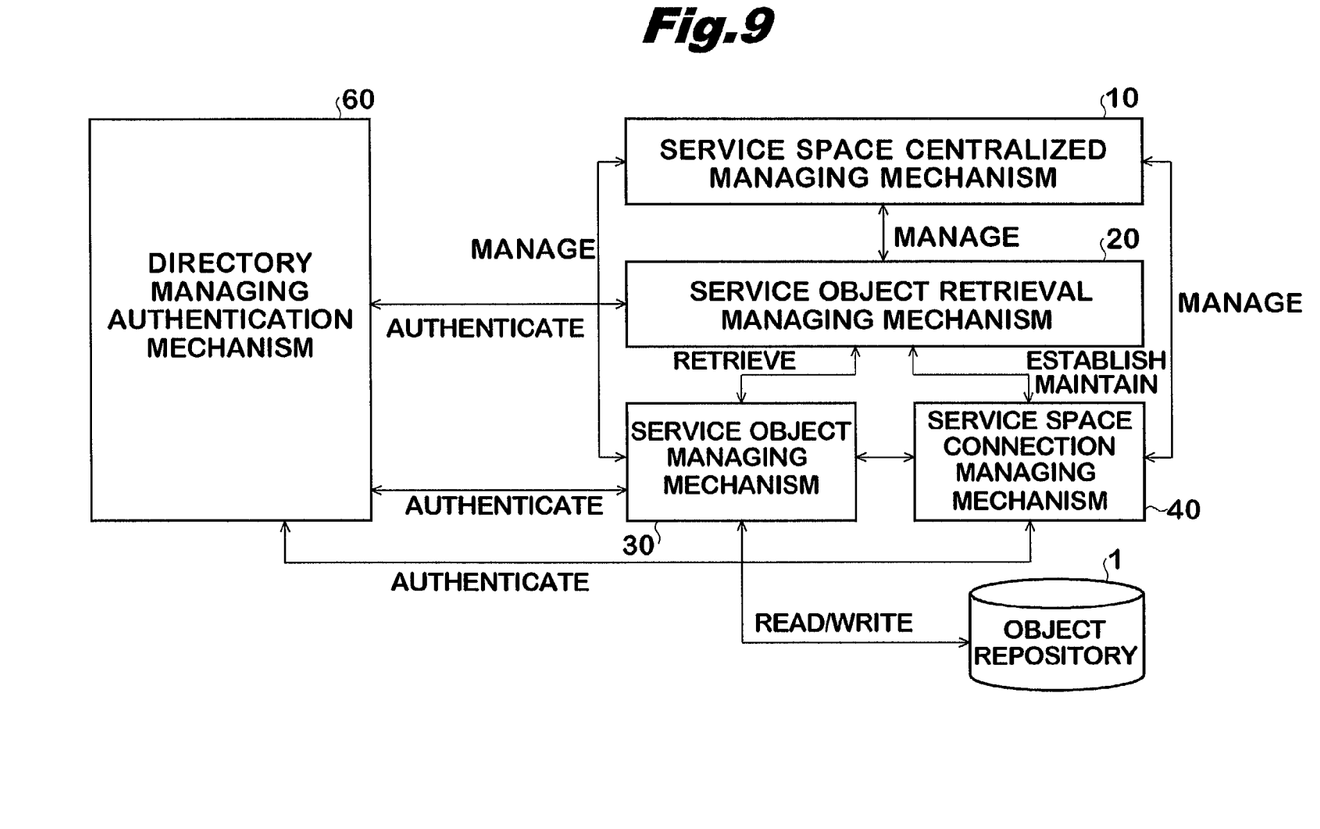
FIG. 9 is a structural diagram of the main part of a distributed directory management system according to a second preferred embodiment of the present invention.

FIG. 9 is a structural diagram of the main part of a distributed directory management system according to the second preferred embodiment of the present invention.

FIG. 9 differs from FIG. 1 only in that a directory managing authentication mechanism 60 is newly provided. The directory managing authentication mechanism 60 has a function of realizing encrypted or signed message communication among the service object retrieval managing mechanism 20, the service object managing mechanism 30 and the service space connection managing mechanism 40 wherein users are authenticated and only those users having access rights are allowed to receive the directory service.

Figure 10:
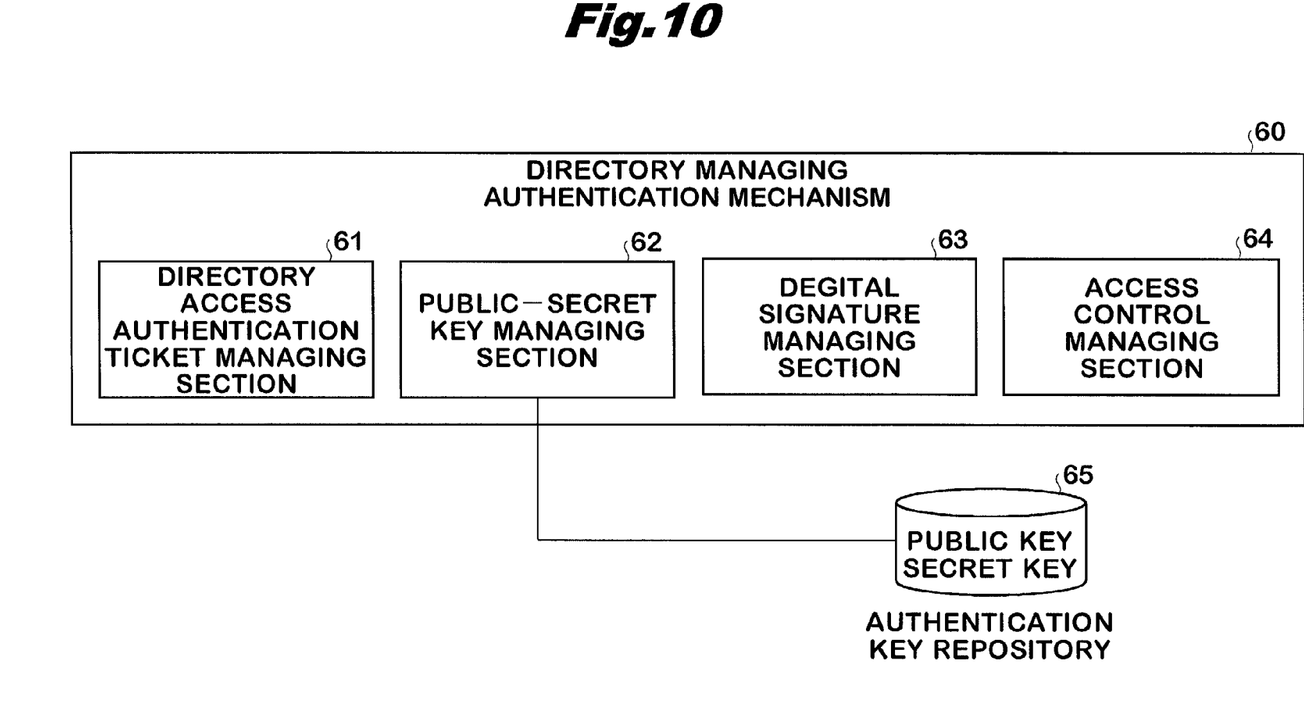
FIG. 10 is a structural diagram of a directory managing authentication mechanism shown in FIG. 9.

FIG. 10 shows a structure of the directory managing authentication mechanism 60.

The directory managing authentication mechanism 60 comprises a directory access authentication ticket managing section 61, a public-secret key managing section 62, a digital signature managing section 63 and an access control managing section 64. The public-secret key managing section 62 is provided with an authentication key repository 65 storing public keys and secret keys.

The public and secret keys are used for authenticating a service object user. For example, if a user uses a secret key thereof to sign a retrieval request message, the directory managing authentication mechanism 60 uses a public key of the user to confirm existence of the signature so as to authenticate whether the user can receive the directory service. Further, for example, data encrypted by the directory managing authentication mechanism 60 using a public key of a user can be decoded only by the user having a corresponding secret key. Accordingly, a retrieval result can be offered only to such a user having an access right.

The directory access authentication ticket managing section 61 issues a ticket for using the directory service to a user and, when the ticket is submitted from the user, verifies the legitimacy of the ticket. The digital signature managing section 63 has a function of executing digital signature and confirming digitally signed data.

In response to an authentication result from the directory access authentication ticket managing section 61 or the digital signature managing section 63, the access control managing section 64 executes an access control upon mutual connection information exchange of the service space connection managing mechanism 40 or upon service object retrieval. Thus, an access by a user having no access right is prohibited so that a proper service can be offered.

Figure 11:
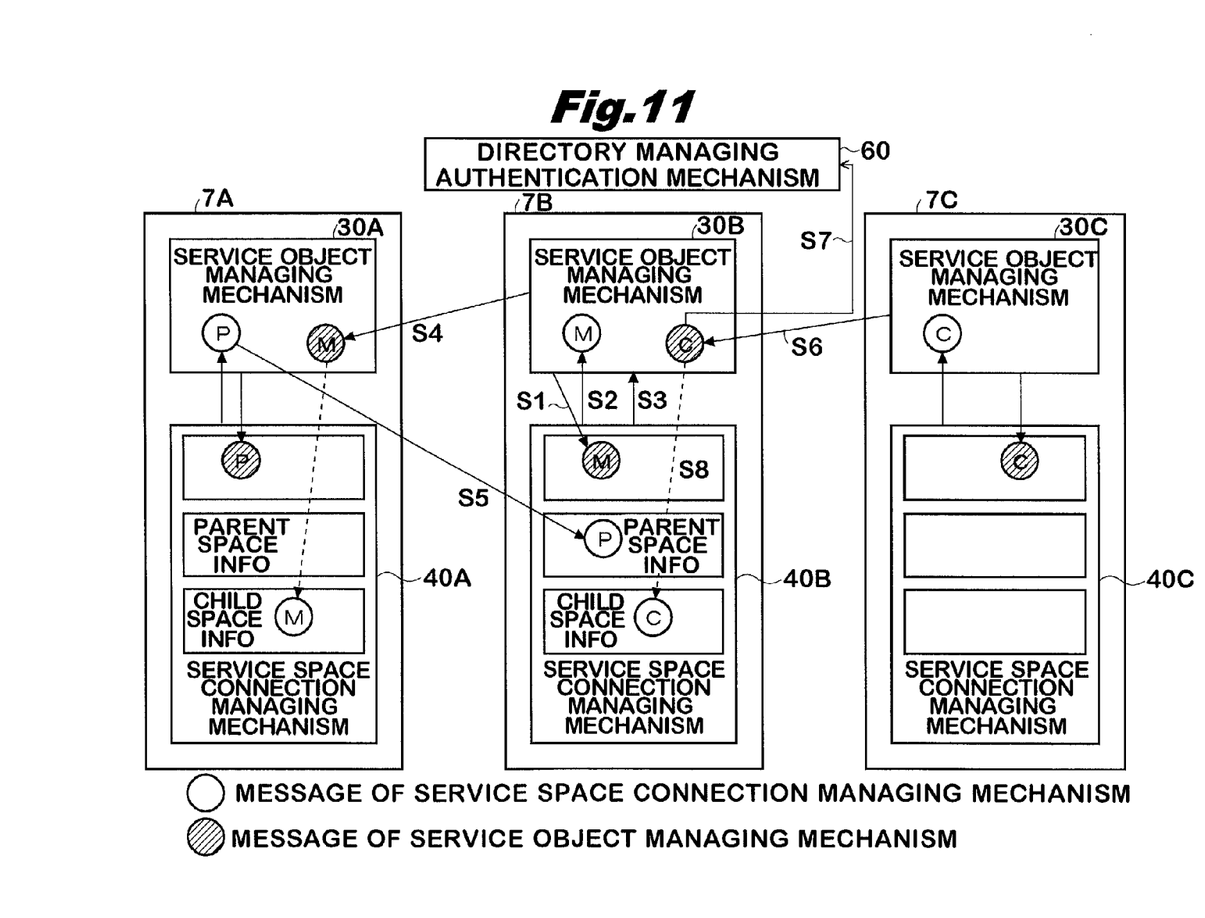
FIG. 11 is a diagram for explaining operations of service space connection managing mechanisms according to the second preferred embodiment of the present invention.

FIG. 11 is a diagram for explaining operations of the service space connection managing mechanisms 40A to 40C according to the second preferred embodiment of the present invention. Although the directory managing authentication mechanism 60 is provided only for the service space 7B in FIG. 11, the directory managing authentication mechanisms 60 are also provided for the service spaces 7A and 7C, respectively.

First, the service object managing mechanisms 30A to 30C and the service space connection managing mechanisms 40A to 40C obtain public keys and/or secret keys from the public-secret key managing sections 62 of the corresponding directory managing authentication mechanisms 60 so as to digitally sign or encrypt messages to be sent. This prevents the messages from being notified to the exterior of the limited service spaces or from being used on the exterior of the limited service spaces.

FIG. 11 differs from FIG. 7 in that the directory managing authentication mechanisms 60 are provided for the service spaces 7A to 7C. Accordingly, in FIG. 11, all the messages M, P and C are assumed to be digitally signed upon sending and decoded upon reception. For example, when the digitally signed message C is received from the service space 7C (step S6), it is authenticated in the service space 7B (step S7) and then registered as a child space information unit (step S8). Although not shown in FIG. 11, this is also applied to the messages M and P. With this authentication process, malfunction of the service space connection managing mechanisms due to receipt of wrong mutual connection information can be effectively prevented.

Now, utilization of the directory managing authentication mechanism 60 by the service object retrieval managing mechanism 20 will be described.

In response to receipt of a retrieval message from a user having an access right, the retrieval analysis executing section 24 shown in FIG. 5 requests the directory managing authentication mechanism 60 shown in FIG. 9 to execute signature on the retrieval message. Presence or absence of the access right of the user is judged at the side of the service object retrieval managing mechanism 20. In this example, it is assumed that the access right is assigned per service space. The signature on the retrieval message is executed by the directory managing authentication mechanism 60 which manages the signature authentication in the same service space as the service object retrieval managing mechanism 20. Then, the service object retrieval managing mechanism 20 sends the signed retrieval message to a directory managing authentication mechanism 60 for another service space to be searched.

In response to receipt of the signed retrieval message, the directory managing authentication mechanism 60 confirms the legitimacy of the signature so as to judge whether the retrieval message is from the service space having the access right. In case of the retrieval message from the service space having no access right, the directory managing authentication mechanism 60 notifies the sender that an access to the service object is not permitted and finishes the process. On the other hand, in case of the retrieval message from the service space having the access right, the directory managing authentication mechanism 60 requests retrieval of the service object to a corresponding service object managing mechanism 30. Then, the retrieval result is notified to the sender via message communication similarly to the foregoing first preferred embodiment. The message including the retrieval result may be encrypted and notified to the sender. As described above, in this example, the access right is given to the whole service space so that all users managed in the subject service space have the access right.

On the other hand, when an access right is given per user, i.e. not per service space, it will be as follows. First, prior to accessing, a ticket for accessing is issued to a corresponding user. The ticket includes, for example, a ticket issuing service space, a ticket effective service space, a sender effective term, a service object user name, a user's public key and a signature of a directory managing authentication mechanism. The ticket issuance per user is carried out in the following manner.

First, upon request from a user, the service object retrieval managing mechanism 20 managing the user sends a ticket request message to the directory managing authentication mechanism 60. The directory managing authentication mechanism 60 extracts a public key of the user from the authentication key repository 65 shown in FIG. 10 based on a name of the user. The directory managing authentication mechanism 60 produces a ticket and encrypts the ticket using the public key of the user.

The directory managing authentication mechanism 60 sends the encrypted ticket to the sender service object retrieval managing mechanism 20. Accordingly, the user obtains a service object retrieval qualification in the service space to which the directory managing authentication mechanism 60 having issued the ticket belongs.

For retrieving a service object, the user sends a retrieval message and the ticket to the service object retrieval managing mechanism 20. In response to receipt of the retrieval message and the ticket, the service object retrieval managing mechanism 20 sends them, via the retrieval analysis execution managing section 24, to the directory managing authentication mechanism 60 belonging to the service space to be searched. In response to receipt thereof, the directory managing authentication mechanism 60 verifies the legitimacy of the ticket and, when the ticket is legitimate, sends the retrieval message to the service object managing mechanism 30 to request retrieval of the service object.

When the retrieval is successful, the service object managing mechanism 30 notifies its result to the directory managing authentication mechanism 60. Then, the directory managing authentication mechanism 60 encrypts the retrieval result using the public key of the user and sends it to the user via the service object retrieval managing mechanism 20.

In either of the foregoing examples, each mechanism encrypts or signs a message using a public or secret key upon implementing message communication so that only such a mechanism permitted to read the message executes the required process. Thus, the security is enhanced and the utilization limit is provided relative to a part of the distributed directory management system in the first preferred embodiment. The directory managing authentication mechanism is provided per service space in this embodiment, but may be provided per service object managing mechanism.

Effect of Second Embodiment

As described above, by adding the directory managing authentication mechanisms to the system of the first preferred embodiment, the encryption and authentication of the message can be accomplished using public and secret keys so that the mutual connection information can be managed safely and reliably. Further, in the service object retrieval, only such a user having permission is allowed to search the corresponding service space. Thus, the retrieval can be executed safely and efficiently with the assistance of the highly reliable security arrangement.

In the foregoing preferred embodiments, the respective mechanisms are realized using the object expression in the Java environment, but may also be realized in the environment of another object oriented language such as the C++ language. Further, in the foregoing preferred embodiments, the object repository is used for storing the service objects. On the other hand, it may also be arranged that the service objects are stored in a different memory and only the attribute information thereof is stored in the object repository in the form of a database. Further, instead of using the public and secret keys, passwords or other encryption algorithms may be used for realizing the directory managing authentication mechanism.

While the present invention has been described in terms of the preferred embodiments and modifications thereof, the invention is not to be limited thereto, but can be embodied in various ways without departing from the principle of the invention as defined in the appended claims.

What is claimed is:

1. A distributed directory management system for offering a retrieval service with respect to service objects stored in object repositories located in service spaces, respectively, said system comprising a service space centralized managing mechanism, service object managing mechanisms, each corresponding to a respective one of said service spaces and the object repository located therein, service space connection managing mechanisms each corresponding to a respective one of said service spaces, and service object retrieval managing mechanisms each corresponding to a respective one of said service spaces, wherein said service space centralized managing mechanism collects mutual connection information of said service spaces from said service space connection managing mechanisms and manages the collected mutual connection information, wherein each of said service object managing mechanisms manages the object repository corresponding thereto and executes retrieval of a service object in said corresponding object repository, wherein each of said service space connection managing mechanisms implements message communication with said service object managing mechanisms to collect mutual connection information of the corresponding service space and another of said service spaces, and manages the collected mutual connection information, wherein each of said service object retrieval managing mechanisms sends a retrieval message from a user to a corresponding one of said service object managing mechanisms to request retrieval from the object repository corresponding thereto of one of the service objects stored therein, receives a result of the retrieval from said corresponding one of said service object managing mechanisms, analyzes the result of the retrieval, and produces a message to be sent to the user based on the analyzed result of the retrieval, wherein each of said service object managing mechanism sends a message indicative of the existence thereof, every time a state thereof is changed, to a corresponding one of said service space connection managing mechanisms, and wherein each of said service space connection managing mechanisms receives said message from the corresponding one of said service object managing mechanisms to update mutual connection information between the service space corresponding to said corresponding one of said service object managing mechanisms and another of said service spaces.

2. A distributed directory management system for offering a retrieval service with respect to service objects stored in object repositories located in service spaces, respectively, said system comprising a service space centralized managing mechanism, service object managing mechanisms, each corresponding to a respective one of said service spaces and the object repository located therein, service space connection managing mechanism each corresponding to a respective one of said service spaces, and service object retrieval managing mechanisms each corresponding to a respective one of said service spaces, wherein said service space centralized managing mechanism collects mutual connection information of said service spaces from said service space connection managing mechanisms and manages the collected mutual connection information, wherein each of said service object managing mechanisms manages the object repository corresponding thereto and executes retrieval of a service object in said corresponding object repository, wherein each of said service space connection managing mechanisms implements message communication with said service object managing mechanisms to collect mutual connection information of the corresponding service spaces and another of said service spaces, and manages the collected mutual connection information, wherein each of said service object retrieval managing mechanisms sends a retrieval message from a user to a corresponding one of said service object managing mechanisms to request retrieval from the object repository corresponding thereto of one of the service object stored therein, receives a result of the retrieval from said corresponding one of said service object managing mechanisms, analyzes the result of the retrieval, and produces a message to be sent to the user based on the analyzed result of the retrieval, wherein each of said service object managing mechanisms periodically sends a message indicative of the existence thereof to a corresponding one of said service space connection managing mechanisms, and wherein each of said service space connection managing mechanisms receives said message from the corresponding one of said service object managing mechanisms to update mutual connection information between the service spaces corresponding to said corresponding one of said service object managing mechanisms and another of said service spaces.

3. The distributed directory management system according to claim 2, wherein each of said service object managing mechanisms uses a multi cast announcing function to send the message indicative of the existence thereof.

4. The distributed directory management system according to claim 1, wherein upon receiving the retrieval message from the user, the corresponding service object retrieval managing mechanism uses the mutual connection information managed by the service space connection managing mechanism corresponding to the service space to which the service object retrieval managing mechanism corresponds, so as to send said retrieval message to said service space and to another of said service spaces for requesting the retrieval.

5. The distributed directory management system according to claim 1, further comprising directory managing authentication mechanisms, each corresponding to a respective one of said service spaces and the object repository located therein, wherein each of said directory managing authentication mechanisms has a function of issuing a ticket for using the retrieval service to a user and, when said ticket is submitted by the user, verifies the legitimacy of the ticket so as to allow said user to access the object repository to which the directory managing authentication mechanism corresponds.

6. The distributed directory management system according to claim 1, further comprising directory managing authentication mechanisms, each corresponding to a respective one of said service spaces and the object repository located therein, wherein each of said directory managing authentication mechanisms has a function of verifying the legitimacy of a digitally signed retrieval message of a user so as to allow said user to access the object repository to which the directory managing authentication mechanism corresponds.

7. The distributed directory management system according to claim 2, wherein upon receiving the retrieval message from the user, the corresponding service object retrieval managing mechanism uses the mutual connection information managed by the service space connection managing mechanism corresponding to the service space to which the service object retrieval managing mechanism corresponds, so as to send said retrieval message to said service space and to another of said service spaces for requesting the retrieval.

8. The distributed directory management system according to claim 2, further comprising directory managing authentication mechanisms, each corresponding to a respective one of said service spaces and the object repository located therein, wherein each of said directory managing authentication mechanisms has a function of issuing a ticket for using the retrieval service to a user and, when said ticket is submitted by the user, verifies the legitimacy of the ticket so as to allow said user to access the object repository to which the directory managing authentication mechanism corresponds.

9. The distributed directory management system according to claim 2, further comprising directory managing authentication mechanisms, each corresponding to a respective one of said service spaces and the object repository located therein, wherein each of said directory managing authentication mechanisms has a function of verifying the legitimacy of a digitally signed retrieval message of a user so as to allow said user to access the object repository to which the directory managing authentication mechanism corresponds.

* * * * *